United States Patent
Okada et al.

(10) Patent No.: US 7,245,275 B2
(45) Date of Patent: Jul. 17, 2007

(54) IMAGE DISPLAY CONTROLLER

(75) Inventors: Tsuyoshi Okada, Kanagawa (JP); Kazufumi Mizusawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 359 days.

(21) Appl. No.: 10/484,892

(22) PCT Filed: Mar. 4, 2003

(86) PCT No.: PCT/JP03/02499

§ 371 (c)(1),
(2), (4) Date: Jan. 26, 2004

(87) PCT Pub. No.: WO03/075573

PCT Pub. Date: Sep. 12, 2003

(65) Prior Publication Data

US 2005/0012685 A1    Jan. 20, 2005

(30) Foreign Application Priority Data

Mar. 5, 2002    (JP) .............................. 2002-058238

(51) Int. Cl.
*G09G 3/00* (2006.01)
(52) U.S. Cl. ......................................... 345/32; 345/1.1
(58) Field of Classification Search ......... 345/1.1–102, 345/623, 663, 634, 679; 348/143–160, 207.99, 348/207.11, 208.4, 333.01–333.05, 14.09, 348/24, 47, 52, 59, 36–39, 207.1, 208.99; 340/435–436, 932.2, 933, 937
See application file for complete search history.

(56) References Cited

U.S. PATENT DOCUMENTS

| | | | | |
|---|---|---|---|---|
| 5,973,726 A * | 10/1999 | Iijima et al. | .................. | 348/38 |
| 5,999,208 A * | 12/1999 | McNerney et al. | ...... | 348/14.08 |
| 6,285,392 B1 * | 9/2001 | Satoda et al. | ............ | 348/14.09 |
| 6,400,405 B2 * | 6/2002 | Tomida et al. | ......... | 348/333.05 |
| 6,593,960 B1 * | 7/2003 | Sugimoto, deceased et al. | .......................... | 348/148 |
| 6,975,347 B1 * | 12/2005 | Strumolo et al. | ........... | 348/148 |
| 7,002,600 B2 * | 2/2006 | Okada et al. | ................ | 345/625 |
| 2005/0110868 A1 * | 5/2005 | Myers | ......................... | 348/47 |
| 2005/0200700 A1 * | 9/2005 | Schofield et al. | ........... | 348/148 |

FOREIGN PATENT DOCUMENTS

| | | |
|---|---|---|
| JP | 10-257482 A | 9/1998 |
| JP | 2000-165831 A | 6/2000 |
| JP | 2000-242896 A | 9/2000 |

* cited by examiner

*Primary Examiner*—Richard Hjerpe
*Assistant Examiner*—Mansour M. Said
(74) *Attorney, Agent, or Firm*—Pearne & Gordon LLP

(57) ABSTRACT

An image display controlling system of the present invention has an image combining splitting means (2) for splitting a picked-up image input from an imaging means (1), which picks up surrounding images of a vehicle, into a plurality of images, an image deforming means (3) for executing a different deforming process to the plurality of images respectively, and an arrangement controlling means (5) for arranging the plurality of images at predetermined positions and displaying the images. According to this configuration, a wide-range image having a horizontal angle of view of 180 degree is separated into a rear center image positioned at a center of the image and side images separated from the center like a vanity with three mirrors, and a sense of depth is provided by distorting and deforming intentionally the side images in contrast to the rear center image such that the side images can look as if the side images are just looked at.

6 Claims, 7 Drawing Sheets

IMAGE DISPLAY CONTROLLER

TECHNICAL FIELD

The present invention relates to an image display controlling system which picks up images in a wide range including a driver's blind spot on the rear side and the front side of a vehicle by using cameras, and displays the images explicitly.

BACKGROUND ART

In a prior art, a system described in JP-A-10-257482, for example, etc. are known as the image display controlling system. FIG. 4 is a configurative block diagram of an image display controlling system in a prior art. In the image display controlling system in the prior art, imaging means 41 are installed into a vehicle, and a plurality of picked-up images output from the imaging means 41 are input into an image combining means 42 to combine therein. The vehicle predictive route locus data generated by a rendering data generating means 43 to assist the driving, etc. are superposed with a combined image which was combined by the image combining means 42, then input into an arrangement controlling means 44 to decide arrangement of the images, and then output onto a displaying means.

The imaging means 41 is a CCD camera loaded on the vehicle, for example. As shown in FIG. 5, (Assume that the front side of the vehicle is indicated by the "front" in FIG. 5. This is similarly true in the following.), two imaging means 41 are fitted to pick up images in respective imaging ranges 501, 502 near left and right side mirrors, and one imaging means 41 is fitted to pick up an image in a rear center imaging range 503. The image combining means 42 combines infinite points in a rear left image 504, a rear right image 505, and a rear image 506 together as one infinite point, then applies a viewing transformation to three images to view these images from one virtual viewpoint, and then formulates a display screen 507 composed of a sheet of image by combining three images. This display can show the image picked up by three imaging means 41, particularly the road surfaces, to the driver in such a way that these images looks as if these images constitute one screen.

However, in this arrangement of these imaging means 41, their viewpoints are different between the imaging means 41 fixed on both sides and the imaging means 41 fixed on the rear center side. In other words, since positions of CCDs for picking up the image are largely different, views of three-dimensional objects that exist at boundaries of the combined display screen 507 are apparently different between respective imaging means 41. For this reason, it is impossible to assemble such objects that are originally seen as different shapes into identical objects, no matter how the virtual viewing transformation is executed. Thus, the driver feels a sense of incompatibility when the display is provided to the driver as the moving image. For example, a profile of other vehicle is changed suddenly at the boundary of the display screen 507 during when such other vehicle is moving from the rear center to the side portion.

Therefore, as shown in FIG. 6, it was considered that a plurality of imaging means 41 should be arranged to locate their viewpoints at almost same positions. In FIG. 6, two imaging means 41 pick up the image on the rear center portion of the vehicle in imaging ranges 510, 511 respectively. In this case, since their viewpoints are close and the positions of CCDs for picking up the image are almost equal, three-dimensional objects that exist at boundaries of a combined display screen 514 are viewed almost identically by the imaging means 41 respectively even when the images picked up by the left and right imaging means 41 are combined panoramically. Therefore, images of the three-dimensional objects such as the road surface, the vehicle existing thereon, etc. at the boundary or joint are connected very naturally, and thus the driver seldom feels a sense of incompatibility at the joint. Positional relationships between an own car and other cars, images of which are being picked up, in an example of FIG. 6 is shown in FIG. 7. A first car 701, a second car 702, a third car 703, and a fourth car 704 are present in order of the farthest position from own car 705. It is understood that the screen in FIG. 6 can display the image in the visual field range of about 180 degree.

The rendering data generating means 43 generates a predictive route locus 515 (e.g., a locus obtained by transferring maximum width lines onto the road surface) as the rendering data when the vehicle backs. Then, the arrangement controlling means 44 controls arrangements of the actual image which was previously adjusted and the locus to produce an image in which two images are superposed as the final display image 514.

As described above, according to the image display controlling system in the prior art, even though the imaging range of each imaging means 41 is narrow, the wide visual field can be implemented on one screen by combining the images picked up by a plurality of imaging means 41, and thus the driver's blind spot can be reduced.

However, the image display controlling system in the prior art having the above configuration has the problems described in the following. That is, in the former of the prior art, as described above, the positions of respective imaging means are largely different. Therefore, even though the images are deformed and then combined, the three-dimensional objects are still viewed to largely deform and thus not only the driver feels a sense of incompatibility but also it is difficult for the driver to know what objects are being displayed. In addition, even if the driver can know what objects are being displayed, it is difficult for the driver to understand which direction the images are in because respective images are simply pasted together two-dimensionally.

Also, in the latter of the prior art, since the images can be seen panoramically, the driver can check what objects are present in the wide visual field. However, such a problem existed that the driver is caused to hallucinate such that he or she looks at the screen in the acute visual field that is considerably narrower than 180 degree, as apparent from the image in FIG. 6, though the screen has the visual field of almost 180 degree, and therefore the driver is caused to lose a sense of direction.

For example, as shown in FIG. 7, actually the forth car 704 should come aside the driver's car essentially when the driver views the car from the rear end of his or her car at which the image is picked up, nevertheless the driver views the car in the obliquely backward direction from the driver's car.

DISCLOSURE OF INVENTION

In order to overcome the above problems, an image display controlling system of the present invention is constructed to have image combining splitting means for splitting a picked-up image to be input from imaging means into a plurality of images; image deforming means for performing a different deforming process for each of the plurality of images; and arrangement controlling means for arranging the plurality of images at predetermined positions to display. According to the configuration, when a wide-range image having a horizontal angle of view of 180 degree is displayed, for example, a single wide-angle image is shown or an image obtained by deforming/combining a plurality of images is generated, then the combined image is separated into an image positioned at a center of the image, i.e., a center image, and images separated from the center, i.e., side images, and then the side images are distorted and deformed intentionally in contrast to the center image such that the side images can look as if the side are just shown. Thus, the image by which the driver can catch easily a sense of direction and has not a sense of incompatibility can be provided.

The image display controlling system of the present invention is constructed to have image combining splitting means for splitting a picked-up image input from imaging means into a plurality of images; image deforming means for performing a different deforming process for each of the plurality of images; rendering data generating means for generating rendering data to emphasize the plurality of images or assist in understanding the images; and arrangement controlling means for arranging the plurality of images and the rendering data at predetermined positions display. According to the configuration, the rendering data generating means for generating rendering data to make the image prominent and deepen the driver's understanding of the image causes the driver, who is looking at the display, to feel a sense of depth easily.

The image display controlling system of the present invention is constructed to further have a plurality of the imaging means; and image combining means for combining a plurality of images input from the plurality of the imaging means; wherein the image combining splitting means splits an image combined by the image combining means again into at least three images, and the image deforming means deforms the three images such that both side images out of the three images are viewed to be closed toward a center image at a predetermined angle. According to the configuration, provision of the image, which has a depth on the rear side such that the driver perceives as if to look at the three-way mirrors, can make the driver perceive easily surrounding behaviors including a sense of direction.

In the image display controlling system of the present invention, the rendering data generating means generates rendering data to have a thickness in such a manner that at least individual images on both sides look to be both side mirrors of a three-way mirrors in which the both side mirrors half open. According to the configuration, it is possible that the images on both sides out of three images look to be both side mirrors of the three-way mirrors in which the both side mirrors half open.

In the image display controlling system of the present invention, the rendering data generating means generates rendering data to give three-dimensional effect by shading the thickness. According to the configuration, it is possible that the images on both sides out of three images look to be both side mirrors of the three-way mirrors in which the both side mirrors half open and that the three-dimensional effect can be brought about by shading.

In the image display controlling system of the present invention, the image display controlling system is installed into a vehicle, an object to be displayed is located on a rear side of the vehicle, the rendering data generating means generates a predictive route locus according to a steering angle when the vehicle backs, and the arrangement controlling means superposes the predictive route locus on a deformed image to display. According to the configuration, the assistance for the driver in the parking can be effectively carried out.

BEST MODE FOR CARRYING OUT THE INVENTION

An embodiment of an image display controlling system of the present invention will be explained with reference to FIG. 1 to FIG. 3 hereinafter.

Figure 1:
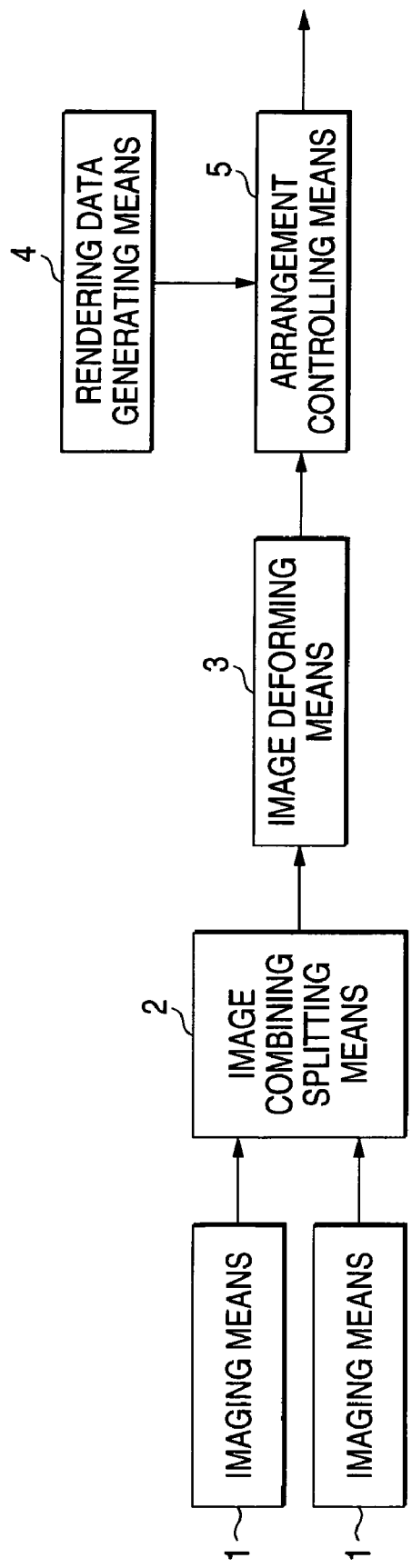
FIG. 1 is a configurative block diagram of an image display controlling system in an embodiment of the present invention.

FIG. 1 is a configurative block diagram of an image display controlling system the present invention. FIG. 2 is an explanatory view showing a flow of operations required until the images picked up by imaging means are deformed and displayed. FIG. 3 is a view showing an actual display example in the image display controlling system of the present invention.

The image display controlling system of the present invention has an image combining splitting means 2 for splitting picked-up image input from imaging means 1, which pick up surrounding images of a vehicle, into a plurality of images, an image deforming means 3 for performing different deforming processes for each of the images respectively, and an arrangement controlling means 5 for arranging a plurality of images at predetermined positions and displaying them.

The image combining splitting means 2 does not always have a function of combining images as an indispensable function. The image combining splitting means 2 combines images and then splits the resultant image if a plurality of imaging means 1 are used, while the image combining splitting means 2 has mainly a function of splitting image if one imaging means 1 is used (e.g., the case in which the image in the wide visual field range is picked up by using a wide-angle lens), because image is not required to combine.

Figure 2:
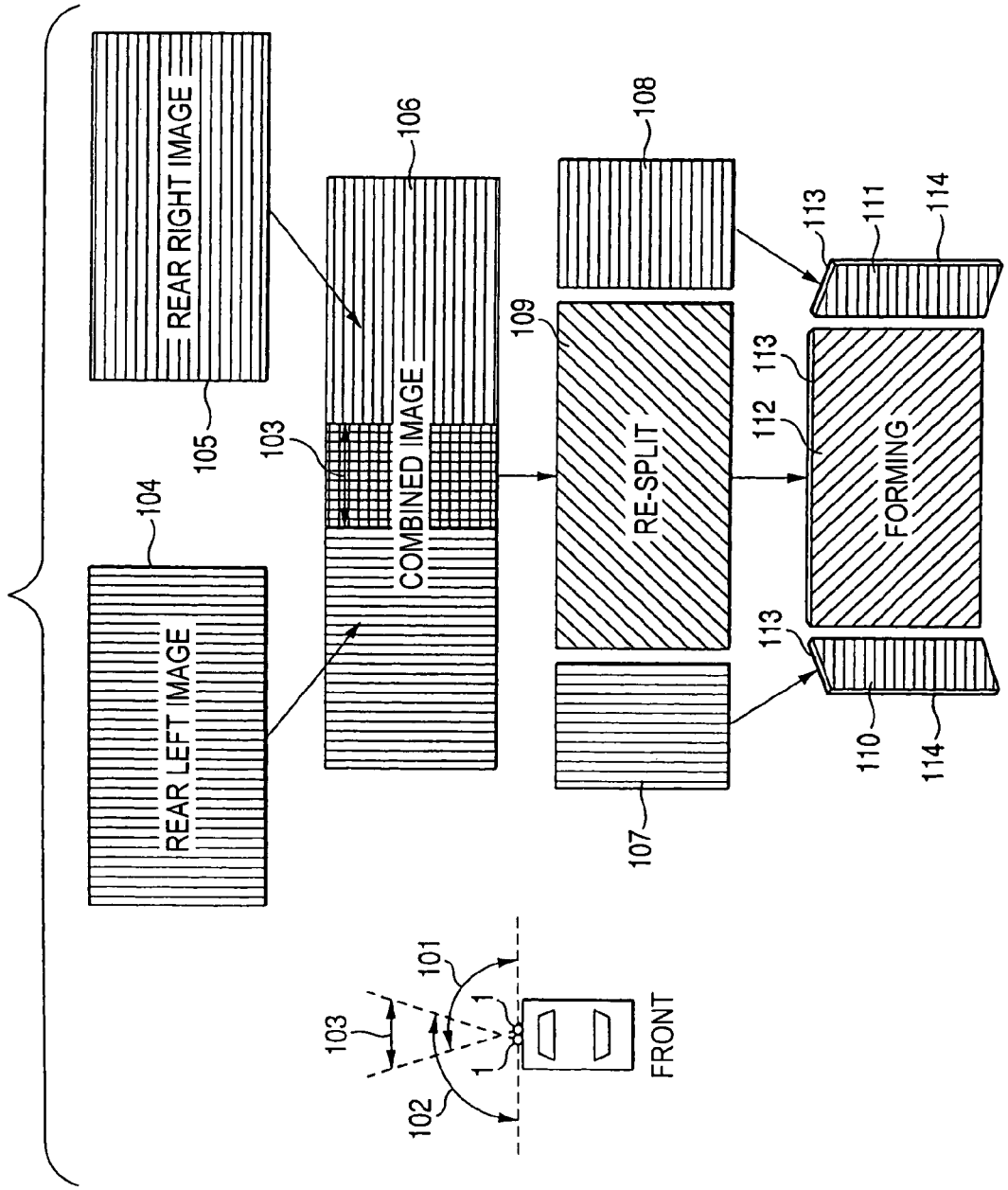
FIG. 2 is an explanatory view showing a flow of image synthesis in the image display controlling system in the embodiment of the present invention.
Figure 3:
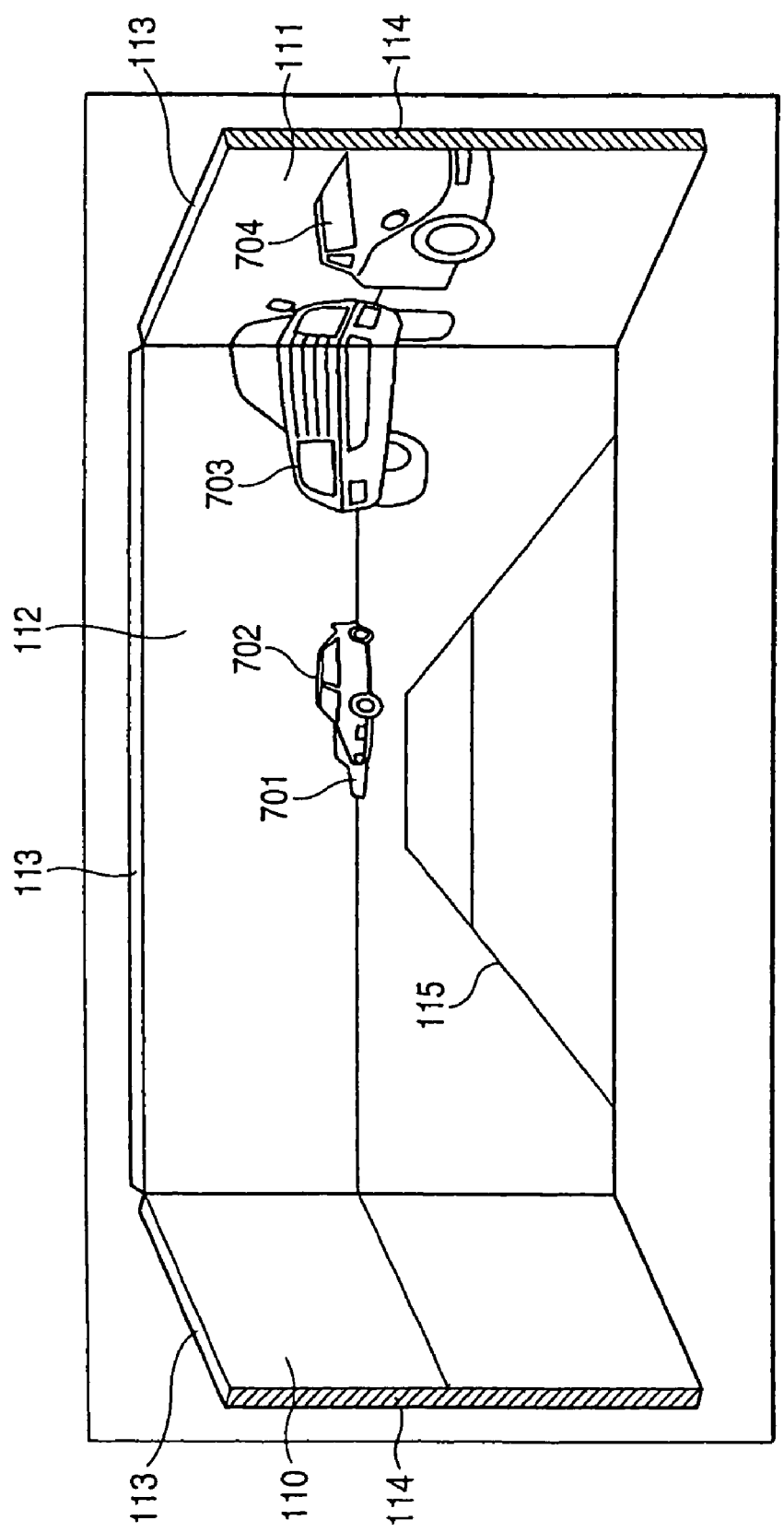
FIG. 3 is an explanatory view showing an actual display example in the image display controlling system in the embodiment of the present invention.
Figure 4:
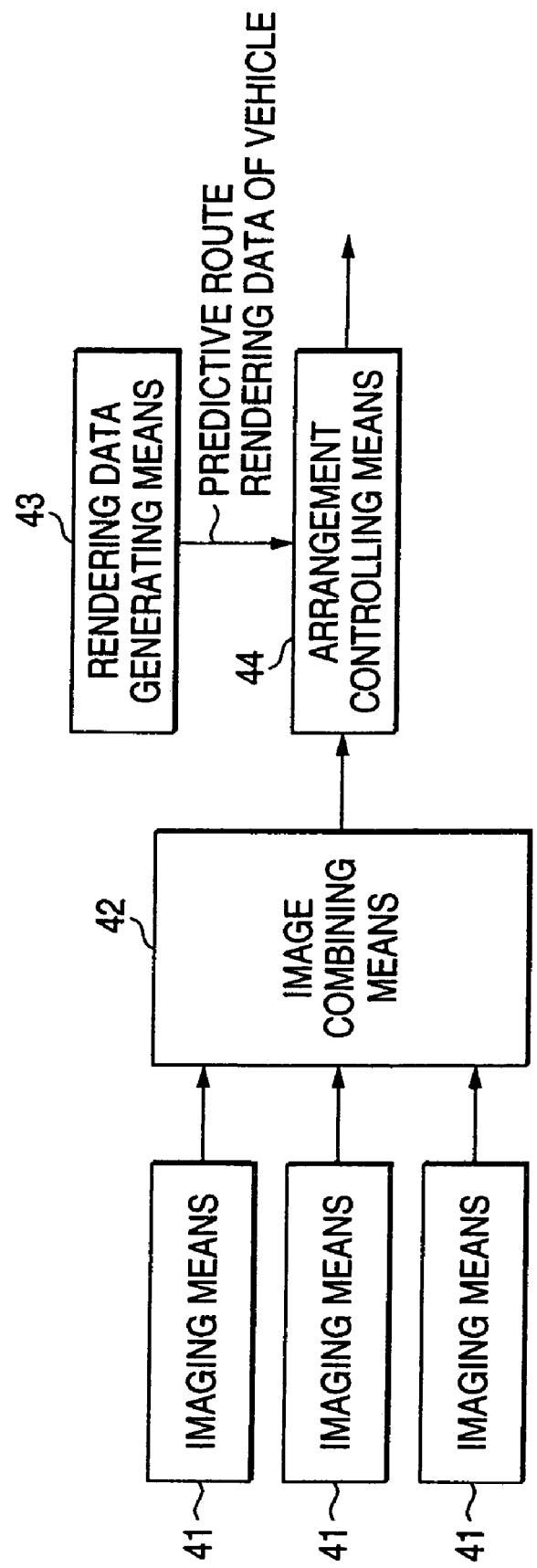
FIG. 4 is a configurative block diagram of an image display controlling system in the prior art.
Figure 5:
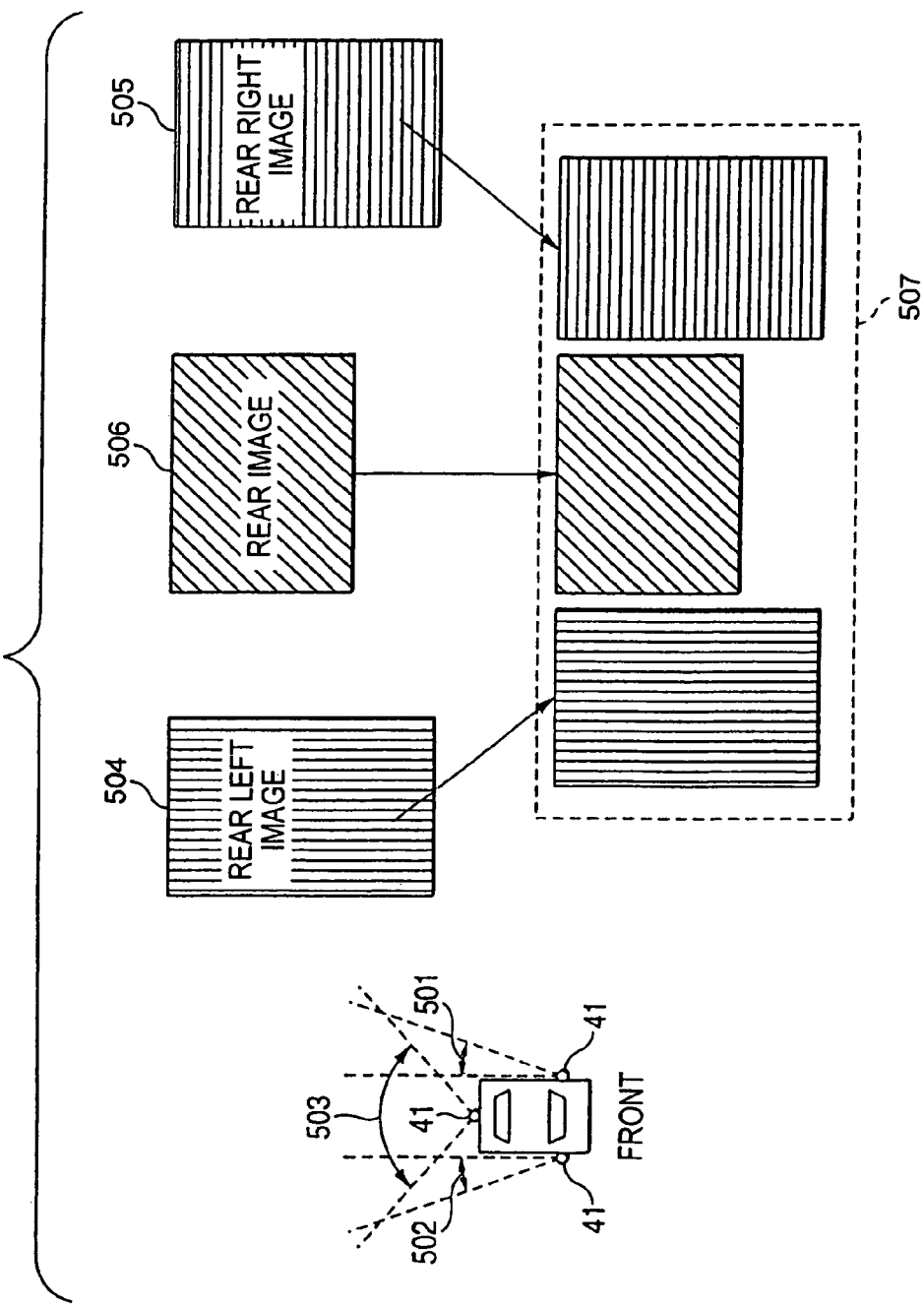
FIG. 5 is an explanatory view showing a flow of image synthesis in the image display controlling system in the prior art.

As shown in the schematic view of the car depicted on the left side of FIG. 2, the imaging means 1 are installed in the rear center portion of the vehicle, e.g., in the neighborhood on the bumper, to pick up images within respective horizontal angles of view of imaging ranges 101, 102. Assumed that the horizontal angle of view of the imaging means 1 is about 110 degree, respective imaging means 1 are arranged to incline by 35 degree mutually in the opposite direction from the vehicle rear center portion to the vehicle side portion, while providing an overlapping area 103 of about 40 degree to the rear center portion of the vehicle so as to make two imaging means acquire the image in the range of more than 180 degree in the horizontal direction. The overlapping area is an area corresponding to a margin to paste up, which is used to produce the panoramic image described later, and might be reduced. In other words, in the case the image in the visual field of horizontal 180 degree is desired to look at by two imaging means, the horizontal angle of view of the imaging means 1 may be set to 90 degree plus a little.

A rear left image 104 and a rear right image 105, which are picked up by two imaging means 1, are at first combined into one combined image 106 by the image combining splitting means 2. As a concrete combining method, a distortion caused by the lens system of the imaging means 1 is removed from each image, then adjustment of slight contraction or expansion of the image and adjustment of vertical and horizontal alignment are executed to view continuously the objects picked up in two images, and then these images are combined panoramically. Alternately, as another combining method, considering a virtual imaging means that has a viewpoint on the vehicle rear side and has an optical axis of the imaging means 1 on the vehicle rear center side, the viewing transformation is executed to the rear left image 104 and the rear right image 105 to view from the viewpoint of the virtual imaging means, and then these images are combined. The latter method is more complicated than the former method, but the latter method can produce the more natural image. In this case, the viewing transformation is the well-known technology and set forth in "Elements of Image Processing Engineering, Keiji Taniguchi, Kyoritsu Publishing Co., Ltd., p.61-62", for example.

Figure 6:
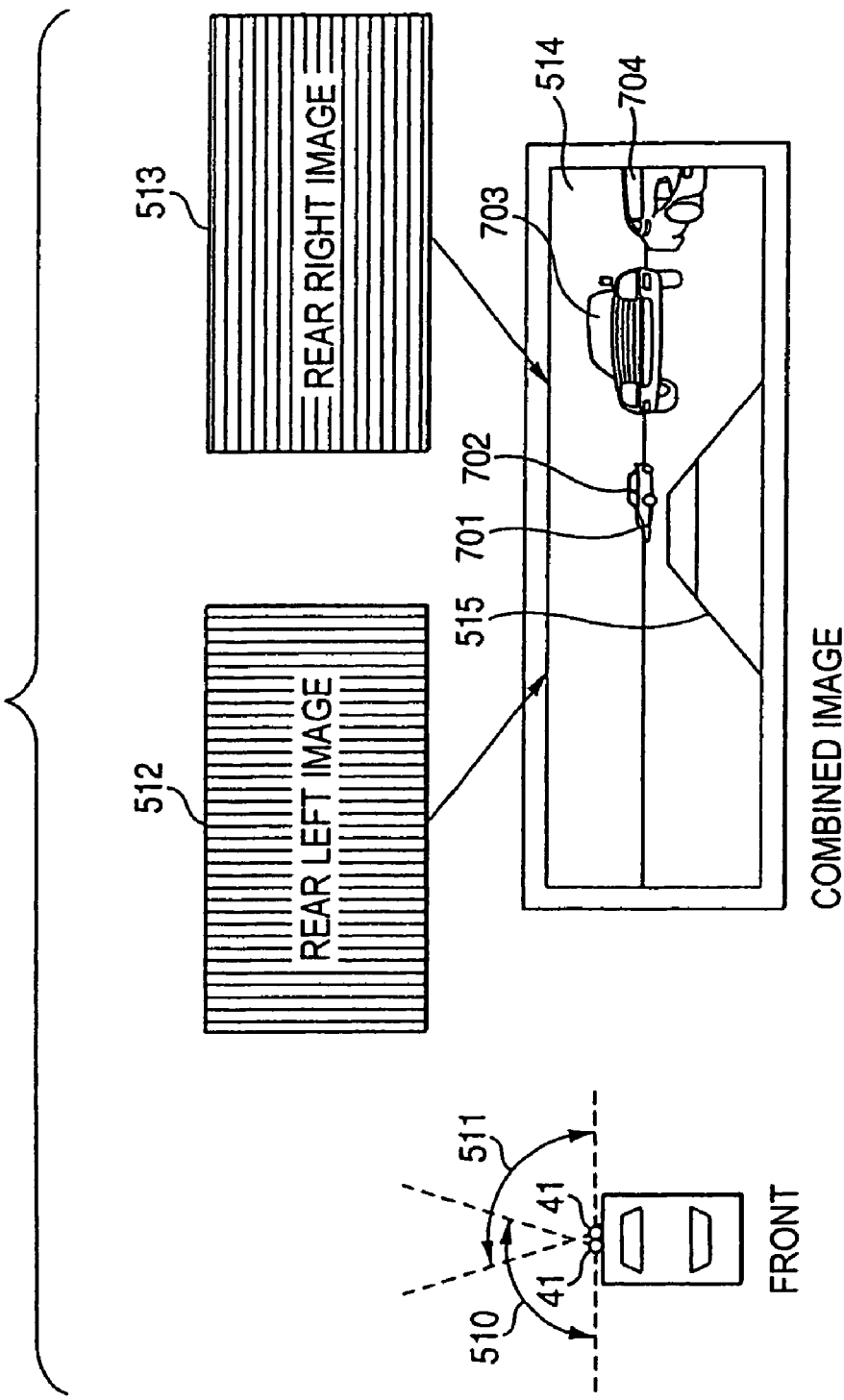
FIG. 6 is an explanatory view showing a flow of image synthesis in the image display controlling system in the prior art.
Figure 7:
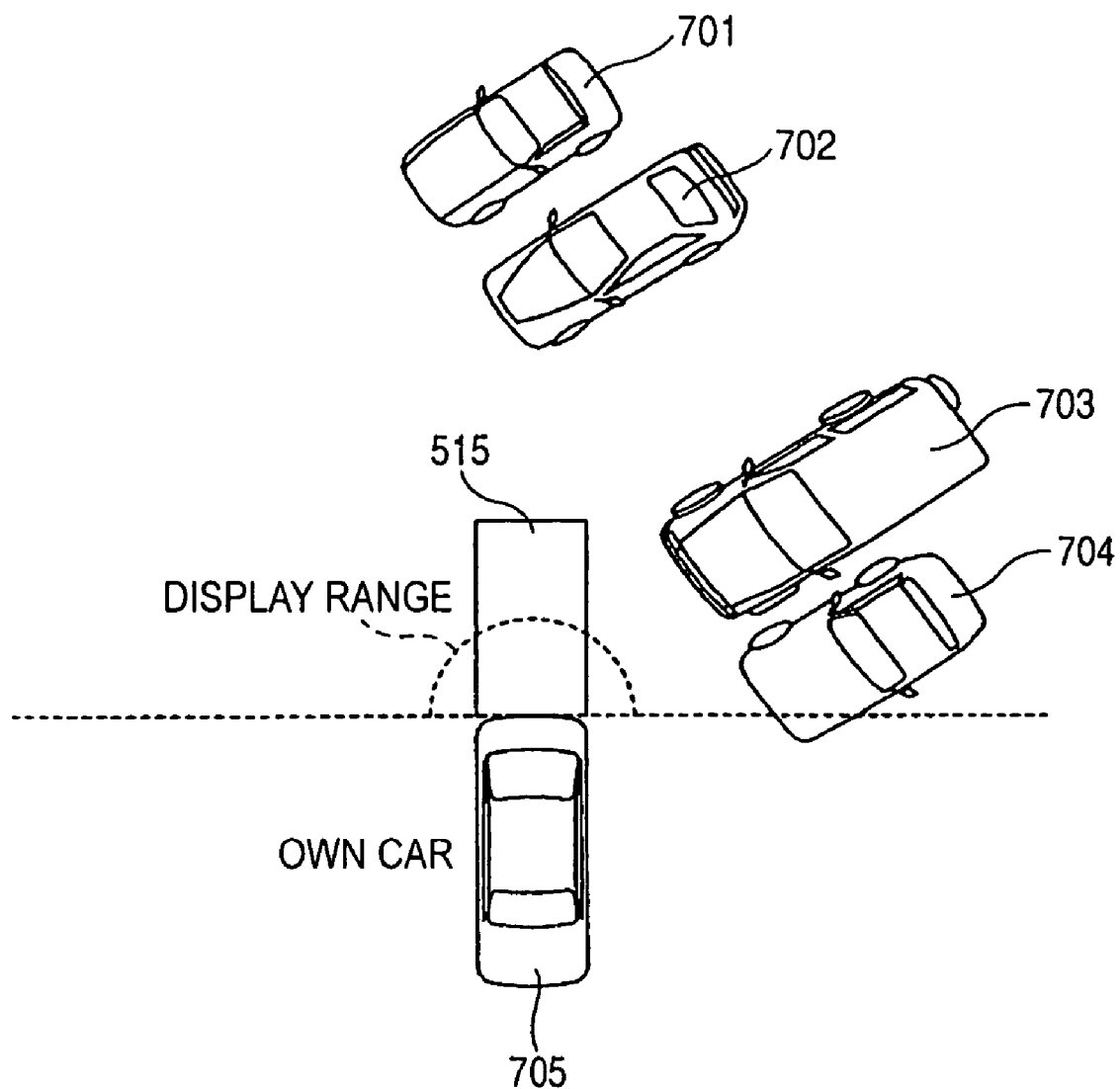
FIG. 7 is an explanatory view showing an example of vehicle arrangement picked up on a screen of the image display controlling system.

The image combined by any method is equivalent to the image in the display example shown in FIG. 6 of the prior art, and shows the overall area of the 180 degrees visual field shown in FIG. 7. The range that the driver continues to look at while making much account of a sense of direction when the driver executes the driving operation such as parallel parking, or the like while looking at the back side is at most the range corresponding to the visual field of about 110 degree. For example, in the parking assisting system by using the typical rear cameras, the horizontal angle-of-view range is almost 90 degree to 120 degree. Conversely, it is possible to say that, when the image in the angle-of-view range of almost 90 degree to 120 degree is to be displayed two-dimensionally, the driver can perceive the surrounding circumstances based on the impression of the image not to lose a sense of direction.

In view of this point, the image display controlling system of the present invention is constructed to split again the combined image 106 into three images of a rear center image 109 having the angle of view of almost 110 degree on the rear center side of the vehicle, and a left surrounding image 107 and a right surrounding image 108 positioned on the more left and more right peripheral sides than the above angle of view of almost 110 degree respectively, by the image combining splitting means 2. In the present embodiment, the angle of view of the rear center image 109 on the rear center side of the vehicle is set to 110 degree. For the above reason, this angle of view might be set in the arrange from 90 degree to 120 degree.

The image deforming means 3 deforms the images by compressing the image itself, applying the distortion to the image on purpose, or the like to make the driver, who is looking at the images, understand roughly which direction of the rear center image 109, the left surrounding image 107, and the right surrounding image 108 are located. For instance, the image deforming means 3 deforms the images into a deformed left surrounding image 110, a deformed right surrounding image 111, and a deformed rear center image 112 in such a way that, under the assumption that above three images correspond to individual mirror surfaces of a three-way mirrors, both side mirrors look as if these side mirrors are closed from a center mirror by a certain angle when the driver faces the vanity with three mirrors from the center. As a result, the image can bring about a sense of depth despite of the plane image, and the driver can perceive the center portion as the image having the angle of view of about 110 degree in the center area. Also, the driver can perceive as if to look at the surrounding portions as the lateral direction.

Since the deformed rear center image 112 can be of course used to check the back side and also be used to assist the driving operation such as the parallel parking while moving backward, such image is displayed as it is without deformation. The deformed left surrounding image 110 and the deformed right surrounding image 111 are deformed such that the mirrors on both ends look as if these mirrors are folded to this side from the center and distorted. For example, these images are displayed to compress slightly in the horizontal direction or are cut off like a parallelogram as a whole. Above deformations are adjusted such that the driver is able to recognize that portions reflected as the deformed images are the side portions of the vehicle and does not lose a sense of direction.

Then, like the image display controlling system in the prior art, the rendering data generating means 4 generates a predictive route locus 115 (e.g., locus obtained by transferring a maximum width line onto the road surface) traced to back the vehicle as the rendering data. Also, the rendering data generating means 4 generates the rendering data by which, for example, picture frames 113, 114 are depicted to have a thickness corresponding to a thickness of the mirror in such a fashion that three images look like individual mirror surfaces of the vanity with three mirrors and also the upper picture frame 113 is colored with a bright color and conversely the side picture frame is colored with a dark color in such a fashion that the light is just irradiated downward onto these picture frames. Then, the arrangement controlling means 5 produces the image, in which the actual image being adjusted previously and the predictive route locus 115 of the driver's car are superposed while mating their arrangement relationships with each other, as the final display image.

Moving locus data into which a route change sensed based on a steering angel from steering information derived from a car sensor is incorporated in real time might be used as the predictive route locus 115 generated by the rendering data generating means 4.

In the present embodiment, an example in which two images picked up by two imaging means are combined and then split is exemplified. But it is needless to say that the present embodiment might be applied to the case where three images or more are combined.

In addition, the present embodiment might be applied to the case where one wide-angle camera is used as the imaging means 1 to pick up the image, as described above.

The present invention is explained in detail with reference to the particular embodiment, but it is obvious for the skilled person in the art that various variation and modifications may be applied without departing from a spirit and a scope of the present invention.

This application is made based on Japanese Patent Application (Patent Application No.2002-58238) filed on Mar. 5, 2002, and contents thereof are incorporated herein by the reference.

INDUSTRIAL APPLICABILITY

As described above, the present invention is able to provide an excellent image display controlling system that can provide a wide-range image to reduce the driver's blind spot and can be utilized as a parking assisting screen not to cause the driver to lose a sense of direction.

The invention claimed is:

1. An image display controlling system comprising:
    image combining splitting means for splitting a picked-up image input from imaging means into at least three images;
    image deforming means for performing a different deforming process for each of the three images such that both side images out of the three images are viewed to be closed toward a center image at a predetermined angle; and
    arrangement controlling means for arranging the three images at predetermined positions to display.

2. The image display controlling system according to claim 1, further comprising:
    rendering data generating means for generating rendering data to emphasize the three images or assist in understanding the three images,
    wherein the arrangement controlling means arranges the three images and the rendering data at predetermined positions to display.

3. The image display controlling system according to claim 2, wherein the rendering data generating means generates rendering data to have a thickness in such a manner that at least individual images on both sides look to be both side mirrors of a three-way mirrors in which the both side mirrors half open.

4. The image display controlling system according to claim 3, wherein the rendering data generating means generates rendering data to give three-dimensional effect by shading the thickness.

5. The image display controlling system according to claim 2, wherein the image display controlling system is installed into a vehicle, an object to be displayed is located on a rear side of the vehicle, the rendering data generating means generates a predictive route locus according to a steering angle when the vehicle backs, and the arrangement controlling means superposes the predictive route locus on a deformed image to display.

6. The image display controlling system according to claim 1, further comprising:
    a plurality of the imaging means; and
    image combining means for combining a plurality of images input from the plurality of the imaging means,
    wherein the image combining splitting means splits an image combined by the image combining means again into the at least three images.

* * * * *